United States Patent
Gibeau (10) Patent No.: US 9,630,518 B2
(45) Date of Patent: Apr. 25, 2017

(54) DYNAMIC GRID LOADING USING PLUG-IN ELECTRIFIED VEHICLES

(71) Applicant: Ford Global Technologies, LLC, Dearborn, MI (US)

(72) Inventor: John Paul Gibeau, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 58 days.

(21) Appl. No.: 14/734,722

(22) Filed: Jun. 9, 2015

(65) Prior Publication Data

US 2016/0362013 A1 Dec. 15, 2016

(51) Int. Cl.
*B60L 11/18* (2006.01)
*B60L 1/00* (2006.01)
*B60L 1/04* (2006.01)
*H02J 7/00* (2006.01)

(52) U.S. Cl.
CPC ........... *B60L 11/1824* (2013.01); *B60L 1/003* (2013.01); *B60L 1/04* (2013.01); *B60L 11/1816* (2013.01); *B60L 11/1844* (2013.01); *B60L 11/1861* (2013.01); *B60L 11/1862* (2013.01); *H02J 7/007* (2013.01); *H02J 7/0052* (2013.01); *B60L 2240/545* (2013.01); *B60L 2240/547* (2013.01); *Y10S 903/907* (2013.01)

(58) Field of Classification Search
CPC .. B60L 11/1824; B60L 11/1816; B60L 1/003; B60L 1/04; B60L 11/1861; B60L 11/1844; B60L 11/1862; B60L 2240/547; B60L 2240/545; H02J 7/007; H02J 7/0052; Y10S 903/907
See application file for complete search history.

(56) References Cited

U.S. PATENT DOCUMENTS

| | | | |
|---|---|---|---|
| 6,946,816 B2 | 9/2005 | Pfab et al. | |
| 7,911,184 B2 | 3/2011 | Kohn | |
| 8,639,413 B2 | 1/2014 | Endo | |
| 2009/0174365 A1* | 7/2009 | Lowenthal | B60L 11/1816 320/109 |
| 2009/0229900 A1* | 9/2009 | Hafner | B60L 3/0046 180/65.275 |
| 2010/0141204 A1* | 6/2010 | Tyler | B60L 11/1816 320/109 |
| 2010/0141205 A1* | 6/2010 | Tyler | B60L 11/1816 320/109 |
| 2011/0001356 A1* | 1/2011 | Pollack | B60L 11/1842 307/31 |
| 2014/0225564 A1* | 8/2014 | North | B60L 11/1842 320/109 |

(Continued)

*Primary Examiner* — Rodney Butler
(74) *Attorney, Agent, or Firm* — David Kelley; Brooks Kushman P.C.

(57) ABSTRACT

A vehicle includes a traction battery configured to be coupled to a power network that is controlled by a grid management system. The vehicle further includes a controller. The controller charges the traction battery and activates vehicle loads based on a request from the grid management system to consume an amount of power from the power network. When the traction battery is fully charged, one or more vehicle loads are activated to consume the amount of power. When a charge power limit of the traction battery is greater than or equal to the amount of power requested, the traction battery is charged to consume the amount of power requested.

20 Claims, 3 Drawing Sheets

(56) References Cited

U.S. PATENT DOCUMENTS

| | | | |
|---|---|---|---|
| 2015/0077054 A1* | 3/2015 | Uyeki | H02J 7/0052 320/109 |
| 2015/0165917 A1* | 6/2015 | Robers | B60L 3/12 320/109 |
| 2015/0224891 A1* | 8/2015 | Petrosian | B60L 11/1851 701/31.4 |
| 2016/0221462 A1* | 8/2016 | Ripoll | B60L 11/1811 |

* cited by examiner

FIG. 3

DYNAMIC GRID LOADING USING PLUG-IN ELECTRIFIED VEHICLES

TECHNICAL FIELD

This application is generally related to matching electrical loads of plug-in electrified vehicles to satisfy demand from power supply infrastructure.

BACKGROUND

Electrified vehicles include plug-in hybrid electric vehicles (PHEV) and battery electric vehicles (BEV). One characteristic of PHEV and BEV vehicles is that they can be connected to a charger to supply energy to an on-board traction battery. The charger is coupled to utility power infrastructure to supply the power requested by the vehicle. The charging process is managed by controllers in the vehicle and in the charging equipment. The power draw of the vehicle may be closely managed by the controllers. Typical features include delaying charging until a time when electricity rates are cheapest. Other features include proportioning electrical energy between the fraction battery and heating/cooling devices to pre-condition the passenger cabin of the vehicle. The charging features thus far depend on a demand for energy by the vehicle. In the absence of a demand for energy by the vehicle, no energy is transferred to the vehicle.

SUMMARY

A vehicle includes a traction battery configured to be coupled to a power network that is controlled by a grid management system. The vehicle further includes a controller programmed to, in response to a request from the grid management system to consume an amount of power from the power network when a charge power limit of the traction battery is less than the amount of power, charge the traction battery and activate a vehicle load to consume power.

The controller may be further programmed to charge the traction battery at the charge power limit. The controller may be further programmed to activate the vehicle load at a power level that is based on a difference between the amount of power and the charge power limit. The controller may be further programmed to, in response to the request from the grid management system to consume an amount of power from the power network when the charge power limit of the traction battery is greater than or equal to the amount of power, charge the traction battery at the amount of power. The vehicle load may be one or more of a heating element, an air conditioning compressor, an auxiliary battery charging system, and a fan. The controller may be further programmed to, in response to the charge power limit being less than a predetermined threshold indicative of the battery being fully charged, activate the vehicle load to consume the amount of power.

A vehicle includes a traction battery configured to be coupled to a power network that is controlled by a grid management system. The vehicle further includes at least one controller programmed to, in response to a request from the grid management system to consume an amount of power from the power network when the traction battery is fully charged, activate at least one vehicle load to consume power from the power network.

The traction battery may be fully charged when a state of charge of the traction battery is greater than a predetermined state of charge. The traction battery may be fully charged when a charge power limit of the traction battery is less than a predetermined power.

The at least one controller may be further programmed to select the at least one vehicle load based on an ambient temperature. The at least one vehicle load may be a first vehicle load having a power consumption capacity greater than or equal to the amount of power that is activated to consume the amount of power. The at least one vehicle load may include a first vehicle load, having a power consumption capacity less than the amount of power, that is activated to consume the power consumption capacity and at least a second vehicle load activated at a power level based on a difference between the amount of power and the power consumption capacity of the first vehicle load.

The at least one controller may be further programmed to, in response to the request from the grid management system when a charge power limit of the traction battery is greater than a predetermined value, charge the traction battery. The at least one controller may be further programmed to, in response to the charge power limit being greater than or equal to the amount of power, charge the traction battery at the amount of power. The at least one controller may be further programmed to, in response to the charge power limit being less than the amount of power, charge the traction battery at the charge power limit.

The at least one controller may be further programmed to activate the at least one vehicle load based on a difference between the amount of power and the charge power limit.

A method includes coupling a traction battery of a vehicle to a power network that is controlled by a grid management system. The method further includes receiving, by a controller, a request from the grid management system to consume an amount of power from the power network. The method further includes activating, by the controller, a vehicle load in response to the amount of power being greater than a charge power limit of the traction battery.

The method may further include charging the traction battery at the charge power limit. The power consumed by the vehicle load may be based on a difference between the amount of power and the charge power limit. The method may further include charging the traction battery with the amount of power in response to the amount of power being less than or equal to the charge power limit.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
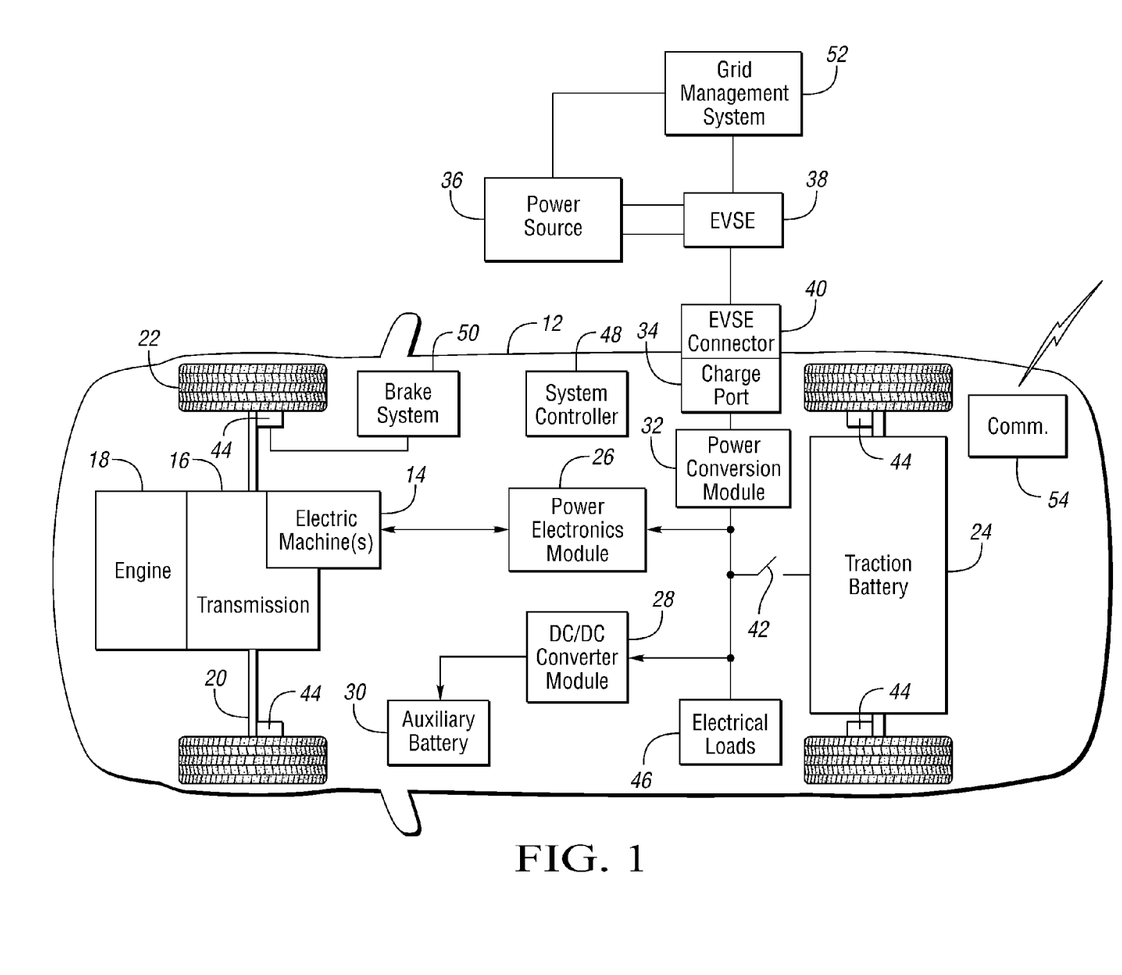
FIG. 1 is a diagram of a hybrid vehicle illustrating typical drivetrain and energy storage components.

FIG. 1 depicts an electrified vehicle 12 that is typically referred to as a plug-in hybrid-electric vehicle (PHEV). A typical plug-in hybrid-electric vehicle 12 may comprise one or more electric machines 14 mechanically coupled to a hybrid transmission 16. The electric machines 14 may be capable of operating as a motor or a generator. In addition, the hybrid transmission 16 is mechanically coupled to an engine 18. The hybrid transmission 16 is also mechanically coupled to a drive shaft 20 that is mechanically coupled to the wheels 22. The electric machines 14 can provide propulsion and deceleration capability when the engine 18 is turned on or off. The electric machines 14 also act as generators and can provide fuel economy benefits by recovering energy that would normally be lost as heat in a friction braking system. The electric machines 14 may also reduce vehicle emissions by allowing the engine 18 to operate at more efficient speeds and allowing the hybrid-electric vehicle 12 to be operated in electric mode with the engine 18 off under certain conditions. An electrified vehicle 12 may include a battery electric vehicle (BEV). In a BEV configuration, the engine 18 may not be present.

A traction battery or battery pack 24 stores energy that can be used by the electric machines 14. A vehicle battery pack 24 typically provides a high voltage DC output. The traction battery 24 is electrically coupled to one or more power electronics modules. One or more contactors 42 may isolate the traction battery 24 from other components when opened and connect the traction battery 24 to other components when closed. The power electronics module 26 is also electrically coupled to the electric machines 14 and provides the ability to bi-directionally transfer energy between the traction battery 24 and the electric machines 14. For example, a traction battery 24 may provide a DC voltage while the electric machines 14 may operate with a three-phase AC current to function. The power electronics module 26 may convert the DC voltage to a three-phase AC current to operate the electric machines 14. In a regenerative mode, the power electronics module 26 may convert the three-phase AC current from the electric machines 14 acting as generators to the DC voltage compatible with the traction battery 24.

In addition to providing energy for propulsion, the traction battery 24 may provide energy for other vehicle electrical systems. A vehicle 12 may include a DC/DC converter module 28 that converts the high voltage DC output of the traction battery 24 to a low voltage DC supply that is compatible with low-voltage vehicle loads. An output of the DC/DC converter module 28 may be electrically coupled to an auxiliary battery 30 (e.g., 12V battery) for charging the auxiliary battery 30. The low-voltage systems may be electrically coupled to the auxiliary battery. Other high-voltage loads 46, such as compressors and electric heaters, may be coupled to the high-voltage output of the fraction battery 24.

The electrified vehicle 12 may be configured to recharge the traction battery 24 from an external power source 36. The external power source 36 may be a connection to an electrical outlet. The external power source 36 may be electrically coupled to a charger or electric vehicle supply equipment (EVSE) 38. The external power source 36 may be an electrical power distribution network or grid as provided by an electric utility company. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically coupled to a charger or on-board power conversion module 32. The power conversion module 32 may condition the power supplied from the EVSE 38 to provide the proper voltage and current levels to the fraction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically coupled or connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 may be coupled to the high-voltage bus. The electrical loads 46 may have an associated controller that operates and controls the electrical loads 46 when appropriate. Examples of electrical loads 46 may be a fan, a heating element and/or an air-conditioning compressor.

Electronic modules in the vehicle 12 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 30. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 12. A vehicle system controller (VSC) 48 may be present to coordinate the operation of the various components.

The vehicle 12 may include a wireless communications module 54 to communicate with devices and systems remote from the vehicle 12. The wireless communications module 54 may include an onboard modem having an antenna to communicate with off-board devices or systems. The wireless communications module 54 may be a cellular communications device to enable communications via a cellular data network. The wireless communications module 54 may be a wireless local area network (LAN) device compatible with IEEE 802.11 family of standards (i.e., WiFi) or a WiMax network. The wireless communications module 54 may include a vehicle based wireless router to allow connection to remote networks in range of a local router. The wireless communications module 54 may interface with one or more controllers in the vehicle 12 to provide data.

The vehicle communication network may extend to the EVSE 38. The vehicle communication network may include conductors that are routed through the charge connector 40 and the charge port 34. In some configurations, a wireless communication protocol via the wireless communications module 54 may be implemented. The EVSE 38 may be configured to communicate with a grid management system 52 that controls and manages the power source 36. A communication system in which an electrified vehicle 12 communicates with a grid management system 52 may be referred to a Vehicle-to-Grid (V2G) communication system.

Figure 2:
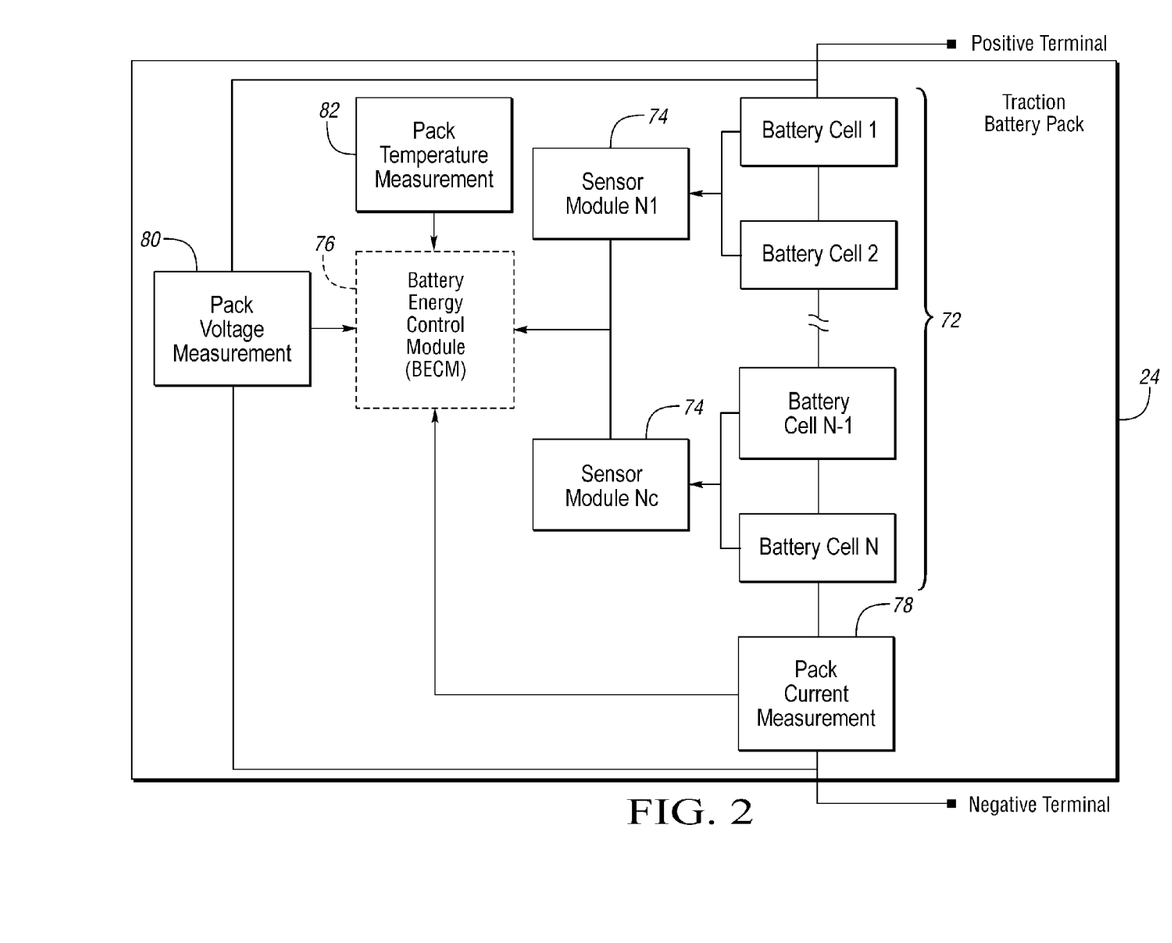
FIG. 2 is a diagram of a possible battery pack arrangement comprised of multiple cells, and monitored and controlled by a Battery Energy Control Module.

A traction battery 24 may be constructed from a variety of chemical formulations. Typical battery pack chemistries may be lead acid, nickel-metal hydride (NIMH) or Lithium-Ion. FIG. 2 shows a typical traction battery pack 24 in a simple series configuration of N battery cells 72. Other battery packs 24, however, may be composed of any number of individual battery cells connected in series or parallel or some combination thereof. A battery management system may have a one or more controllers, such as a Battery Energy Control Module (BECM) 76, that monitor and control the performance of the traction battery 24. The battery pack 24 may include sensors to measure various pack level characteristics. The battery pack 24 may include one or more pack current measurement sensors 78, pack voltage measurement sensors 80, and pack temperature measurement sensors 82. The BECM 76 may include circuitry to interface with the pack current sensors 78, the pack voltage sensors 80 and the pack temperature sensors 82. The BECM 76 may have non-volatile memory such that data may be retained when the BECM 76 is in an off condition. Retained data may be available upon the next key cycle.

In addition to the pack level characteristics, there may be battery cell 72 level characteristics that are measured and monitored. For example, the terminal voltage, current, and temperature of each cell 72 may be measured. A system may use a sensor module 74 to measure the battery cell 72 characteristics. Depending on the capabilities, the sensor module 74 may measure the characteristics of one or multiple of the battery cells 72. The battery pack 24 may utilize up to $N_c$ sensor modules 74 to measure the characteristics of all the battery cells 72. Each sensor module 74 may transfer the measurements to the BECM 76 for further processing and coordination. The sensor module 74 may transfer signals in analog or digital form to the BECM 76. In some configurations, the sensor module 74 functionality may be incorporated internally to the BECM 76. That is, the sensor module 74 hardware may be integrated as part of the circuitry in the BECM 76 and the BECM 76 may handle the processing of raw signals. The BECM 76 may also include circuitry to interface with the one or more contactors 42 to open and close the contactors 42.

It may be useful to calculate various characteristics of the battery pack. Quantities such as battery power capability and battery state of charge may be useful for controlling the operation of the battery pack as well as any electrical loads receiving power from the battery pack. Battery power capability is a measure of the maximum amount of power the battery can provide or the maximum amount of power that the battery can receive. Knowing the battery power capability allows the electrical loads to be managed such that the power requested is within limits that the battery can handle.

Battery pack state of charge (SOC) gives an indication of how much charge remains in the battery pack. The SOC may be expressed as a percentage of the total charge remaining in the battery pack. The battery pack SOC may be output to inform the driver of how much charge remains in the battery pack, similar to a fuel gauge. The battery pack SOC may also be used to control the operation of an electric or hybrid-electric vehicle. Calculation of battery pack SOC can be accomplished by a variety of methods. One possible method of calculating battery SOC is to perform an integration of the battery pack current over time. This is well-known in the art as ampere-hour integration.

The battery power capability may establish charge and discharge limits for the traction battery 24. The BECM 76 may compute a battery charge limit and a battery discharge limit periodically based on battery parameters and measurements. The battery charge limit may be zero when the traction battery 24 cannot be charged. When the traction battery 24 is fully charged, the battery charge limit may be zero. The traction battery 24 may be fully charged when the state of charge is greater than predetermined state of charge. The predetermined state of charge may be near a state of charge of one hundred percent.

Plug-in hybrid vehicles and battery electric vehicles may be referred to as electrified vehicles. An electrified vehicle 12 may be configured to charge the traction battery 24 using a power source 36 external to the vehicle 12. The power source 36 may be part of a power network or grid of an electrical utility. The power grid may be a complex interconnection of power generators and loads. The power grid includes transmission lines to transport electricity to a multitude of locations, in including homes and businesses.

A primary producer of electricity may be the electrical utility company that operates power generation facilities. However, modern technology may provide opportunities for additional secondary producers of electricity. For example, consumers may install solar panels to generate electricity for household use. In some instances, consumers may sell electricity to the power company and provide electricity over the power network. Such configurations may enable the power company to meet periods of peak electricity demand by buying electricity from secondary producers.

The grid management system 52 may monitor the power network and manage loads that are controllable. The grid management system 52 may determine power demand from loads connected to the power network and attempt to match power supplied to the power demand. The grid management system 52 may command connected loads to draw power or stop drawing power. The grid management system 52 may command connected power suppliers to provide power or discontinue providing power. The grid management system 52 may attempt to match electrical power supply to electrical power demand to minimize cost or maximize system efficiency. The grid management system 52 may be configured to minimize transmission losses by activating a nearest supplier to the electrical demand.

The grid management system 52 may include one or more controllers. The controllers may communicate via a network. The grid management system 52 may communicate with a plurality of power supply devices and electrified vehicles 12 that are coupled to the power grid. Various communication protocols may be established to facilitate the transfer of messages via the network. The EVSE 38 may include a controller that is coupled to the network. The grid management system 52 may communicate with the EVSE 38 to exchange data. For example, the EVSE 38 may communicate that a vehicle 12 is connected to the grid. The grid management system 52 may communicate a power consumption request to the EVSE 38 that may then be communicated to the vehicle 12. In some configurations, the electrified vehicle 12 may communicate wirelessly via the wireless communication module 54 to the grid management system 52.

In relation to a vehicle 12 incorporating V2G communication capability, several applications may be described. Two distinct modes of energy transfer may be described. In a bi-directional mode of energy transfer, the electrified vehicle is configured to sink (e.g., consume) and source (e.g., provide) electrical power. In a unidirectional mode of energy transfer, the electrified vehicle is configured to sink power only. V2G communications may improve utility load leveling by charging vehicles when electricity demand is low, typically at night. The electrified vehicle 12 and the power network may exchange information as to the appropriate time to charge.

In a vehicle configured to bi-directionally transfer energy, the vehicle may be requested to transfer energy stored or created in the vehicle 12 to the power network. For example, the traction battery 24 may be fully charged during a drive cycle from operation of the engine 18 and electric machines 14. The power network may issue a request for power from the vehicle 12. The vehicle 12 may respond by providing a requested level of power to the network. The power utility may compensate the car owner for providing the electricity. Such a system may allow for the power network to respond to periods of peak demand without the need for upgrading power generating facilities.

For an electrified vehicle 12, electricity demand is generally determined based on fraction battery 24 charging and/or running accessory loads 46 for cabin or component pre-conditioning. Such electricity demand is based on the demands of the electrified vehicle 12. The electrified vehicle 12 determines when and at what level the traction battery 24 will be charged. The electrified vehicle 12 also determines when the accessory loads 46 will be operated. A maximum charge power of the EVSE 38 may be communicated to the electrified vehicle 12 or otherwise stored as a value in one or more controllers (e.g., 76). The maximum charge power may then be distributed between battery charging and accessory loads as determined by the controller (e.g., 76).

In a unidirectional mode of energy transfer, an electrified vehicle owner may derive value from the electrical grid. In a first scenario, the utility may provide payment to the electrified car owner, either directly or through reduced rates, to reduce power draw during certain conditions. Such a configuration may be similar to an interruptible power line that is controlled by the utility and may be interrupted during peak demand periods. The user of the interruptible power line may benefit from reduced electricity rates for providing the utility with increased flexibility. In a second scenario, the utility may compensate the electrified vehicle owner to draw power from the power network to assist with overall load management of the electrical grid. The electrified vehicle 12 may accomplish this task by charging the traction battery 24. An issue may occur when the traction battery 24 is fully charged (e.g., 100% state of charge). As the state of charge of the traction battery 24 increases, the amount of power drawn by the traction battery may decrease. As the state of charge increases, the traction battery 24 may not be able to meet the power demand requested by the power network.

The electrified vehicle 12 may utilize the additional electrical loads 46 to meet the power demand of the power network. For example, one of the electrical loads 46 may be an electric heater. When the power demand of the traction battery 24 cannot satisfy the power demand, one or more of the electrical loads 46 may be activated to fulfill the power demand. The grid management system 52 may output a power demand request to the vehicle 12. A controller 48 in the vehicle 12 may receive the power demand and determine how to apportion the power demand among the electrical devices of the vehicle 12. Priority may be given to charging the traction battery 24. The traction battery controller 76 may compute and output a charge power capability. When the charge power capability is greater than the power network demand, the power demand may be satisfied by charging the traction battery 24.

When the charge power capability is less than the network power demand, one or more electrical loads 46 may be activated at a power level based on the difference between the network power demand and the charge power capability. This configuration allows the vehicle 12 to satisfy the network power demand to assist in unidirectional V2G services.

The electrical loads 46 depicted describe those loads coupled to the output of the traction battery 24 and may be referred to as high-voltage loads. Additional loads may be connected to the auxiliary battery 30 and the output of the DC/DC converter module 28 and may be referred to as low-voltage loads. In some configurations, the low-voltage loads may be activated to consume electrical power provided by the DC/DC converter module 28.

A variety of electrical loads 46 may be configured to be activated. An electrical load power consumption level may be computed as the difference between the network power demand and the traction battery charge power capability. The electrical loads 46 may include fans, an air-conditioning compressor, and heating elements. Each of the electrical loads 46 may have a power consumption capacity that is an amount of power that the load can presently consume. The controller 48 may attempt to match the electrical load power consumption level with an electrical load 46 having a power consumption capacity that is greater than the electrical load power consumption level. In such a case, only one vehicle load 46 may be activated to satisfy the demand.

In some situations, the electrical load power consumption level may be greater than the power consumption capacity of any one vehicle load 46. In this case, a first vehicle load may be activated at an associated power consumption capacity and a second vehicle load may be activated at power level based on a difference between the electrical load power consumption level and the power consumption capacity of the first vehicle load.

The controller 48 may select the appropriate vehicle load 46 to activate based on other criteria. The vehicle 12 may include an ambient temperature sensor that provides a signal indicative of the ambient temperature. The controller 48 may receive the ambient temperature as an input. The vehicle loads 46 to be activated may be based on the ambient temperature. For example, when the ambient temperature is greater than a predetermined temperature indicative of hot weather, the activated vehicle loads 46 may be those loads related to an air-conditioning system (e.g., air-conditioning compressor, fans). When the ambient temperature is less than a predetermined temperature indicative of cold weather, the vehicle loads 46 that are activated may be those loads related to a heating system (e.g., heating elements for cabin/seats, fans).

The electrical loads 46 may be monitored to ensure that temperature or other operational limits are not exceeded. The electrical loads 46 may be deactivated if operational limits of the component are exceeded. Should an electrical load 46 become deactivated, another electrical load 46 may be activated. The controller 48 may prioritize the activation of the electrical loads 46. Additionally, activation of the electrical loads 46 may be dependent upon the power demand to be supplied. The controller 48 may store a predetermined schedule based on the power demand to be provided.

Figure 3:
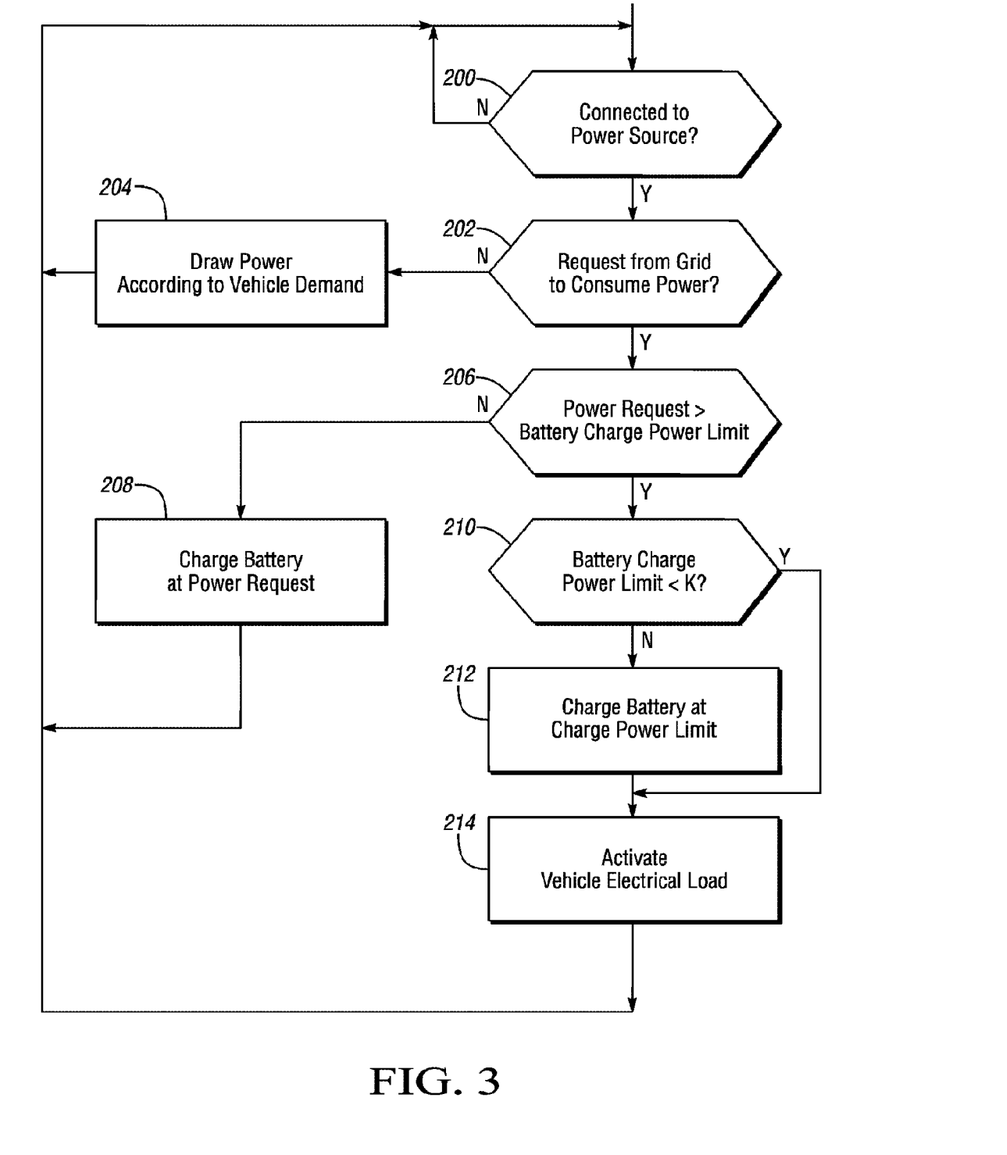
FIG. 3 is a flow chart depicting a possible sequence of operations for the vehicle to respond to a request to consume power from an electrical power network.

FIG. 3 depicts a flow chart for a control strategy that may be implemented in an electrified vehicle 12. The operations may be implemented in one or more controllers (e.g., 48) in the vehicle 12. At operation 200, the controller may determine if a connection to the power source 36 has been established. For example, the controller 48 may detect that the EVSE connector 40 is coupled to the charge port 34. If no connection is detected, operation 200 may be repeated periodically. If a connection to the power source 36 is detected, execution may proceed to operation 202.

At operation 202, the controller 48 may determine if the grid management system 52 has issued a request for the vehicle to consume power. If no request is detected, execution may proceed to operation 204. At operation 204, the controller 48 may implement instructions to draw power from the power source according to the vehicle demands. For example, the traction battery 24 may be charged according to a charging schedule set by the operator. If a request to consume power is detected, execution may proceed to operation 206.

At operation 206, the controller 48 may compare the power request to the battery charge power limit. If the amount of power requested is less than or equal to the battery charge power limit, execution may proceed to operation 208 which may command the traction battery 24 to charge according to the power requested from the grid management system 52. If the amount of power requested is greater than the battery charge power limit, execution may proceed to operation 210. At operation 210, the battery charge power limit is compared to a threshold at which charging is not feasible. The threshold may be indicative of a fully charged traction battery 24. If the battery charge power limit is greater than or equal to the threshold, operation 212 may be performed in which the traction battery 24 is charged at the battery charge power limit followed by operation 214. If the battery charge limit is below the threshold, operation 214 may be performed in which one or more electrical loads 46 in the vehicle 12 are activated. The electrical loads 46 may be operated at a power level defined by the difference between the power request and the battery charge power limit. The operations may be repeated periodically while the vehicle 12 is coupled to the power source 36. When the vehicle 12 decouples from the power source 36, battery charging may be discontinued and the electrical loads 46 may be deactivated.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a traction battery configured to be coupled to a power network that is controlled by a grid management system; and
a controller programmed to, in response to a request from the grid management system to consume an amount of power from the power network that is greater than a charge power limit of the traction battery, charge the traction battery and activate a vehicle load to consume the amount of power.

2. The vehicle of claim 1 wherein the controller is further programmed to charge the traction battery at the charge power limit.

3. The vehicle of claim 1 wherein the controller is further programmed to activate the vehicle load at a power level that is based on a difference between the amount of power and the charge power limit.

4. The vehicle of claim 1 wherein the controller is further programmed to, in response to the request from the grid management system to consume the amount of power from the power network that is less than the charge power limit of the traction battery, charge the traction battery at the amount of power.

5. The vehicle of claim 1 wherein the vehicle load is one or more of a heating element, an air conditioning compressor, an auxiliary battery charging system, and a fan.

6. The vehicle of claim 1 wherein the controller is further programmed to, in response to the charge power limit being less than a predetermined threshold indicative of the battery being fully charged, activate the vehicle load to consume the amount of power.

7. A vehicle comprising:
a traction battery configured to be coupled to a power network that is controlled by a grid management system; and
at least one controller programmed to, in response to a request from the grid management system to consume an amount of power from the power network when the traction battery is fully charged, activate at least one vehicle load to consume power from the power network.

8. The vehicle of claim 7 wherein the traction battery is fully charged when a state of charge of the traction battery is greater than a predetermined state of charge.

9. The vehicle of claim 7 wherein the traction battery is fully charged when a charge power limit of the traction battery is less than a predetermined power.

10. The vehicle of claim 7 wherein the at least one controller is further programmed to select the at least one vehicle load based on ambient temperature.

11. The vehicle of claim 7 wherein the at least one vehicle load is a first vehicle load having a power consumption capacity greater than or equal to the amount of power that is activated to consume the amount of power.

12. The vehicle of claim 7 wherein the at least one vehicle load includes a first vehicle load, having a power consumption capacity less than the amount of power, that is activated to consume the power consumption capacity and at least a second vehicle load activated at a power level based on a difference between the amount of power and the power consumption capacity of the first vehicle load.

13. The vehicle of claim 7 wherein the at least one controller is further programmed to, in response to the request from the grid management system when a charge power limit of the traction battery is greater than a predetermined value, charge the traction battery.

14. The vehicle of claim 13 wherein the at least one controller is further programmed to, in response to the charge power limit being greater than or equal to the amount of power, charge the traction battery at the amount of power.

15. The vehicle of claim 13 wherein the at least one controller is further programmed to, in response to the charge power limit being less than the amount of power, charge the traction battery at the charge power limit.

16. The vehicle of claim 15 wherein the at least one controller is further programmed to activate the at least on vehicle load based on a difference between the amount of power and the charge power limit.

17. A method comprising:
coupling a traction battery of a vehicle to a power network that is controlled by a grid management system;
receiving, by a controller, a request from the grid management system to consume an amount of power from the power network; and
activating, by the controller, a vehicle load in response to the amount of power being greater than a charge power limit of the traction battery.

18. The method of claim 17 further comprising charging the traction battery at the charge power limit.

19. The method of claim 17 wherein a power consumed by the vehicle load is based on a difference between the amount of power and the charge power limit.

20. The method of claim 17 further comprising charging the traction battery with the amount of power in response to the amount of power being less than or equal to the charge power limit.

* * * * *